INVENTOR
Hermann Wiegand
BY

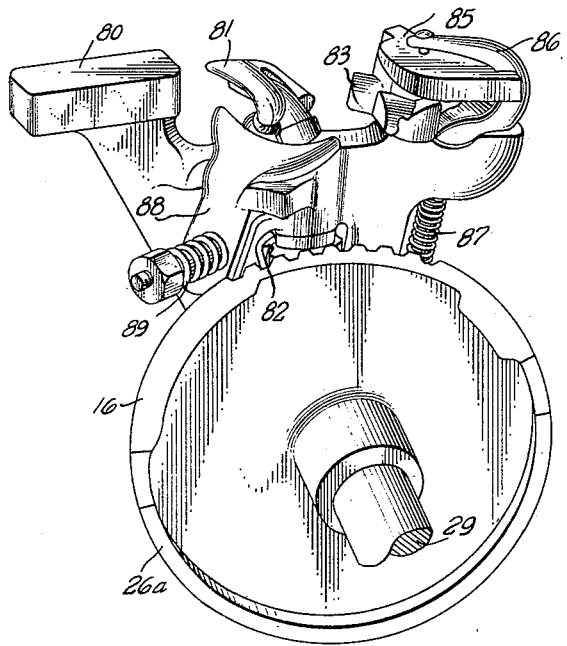
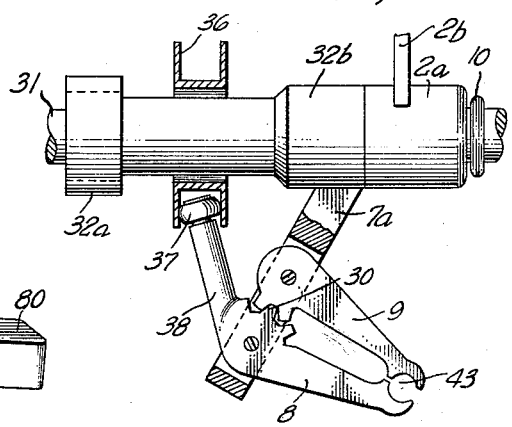
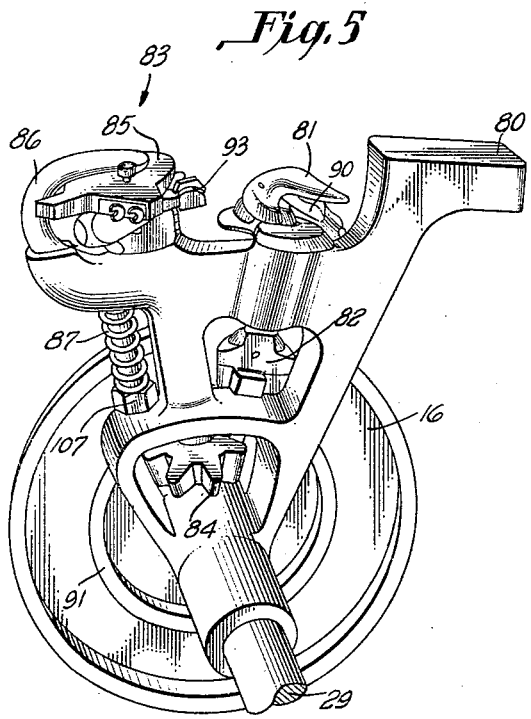

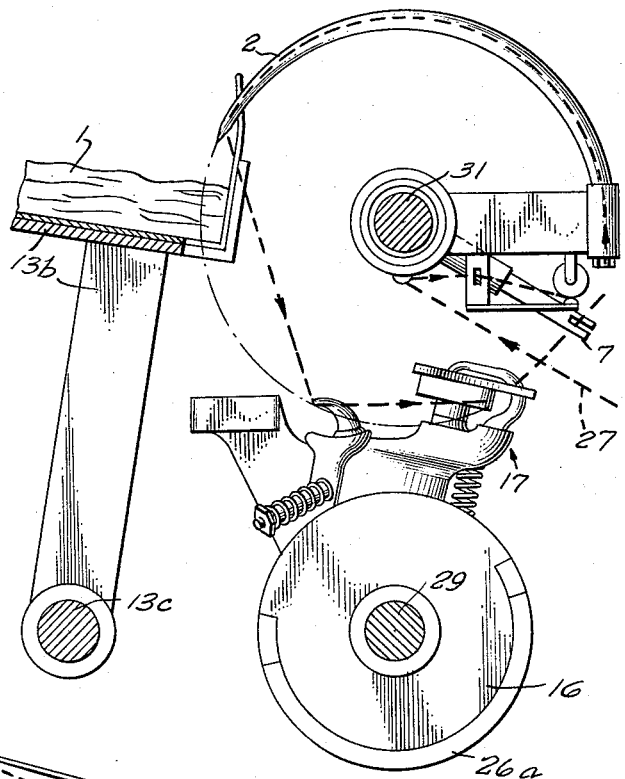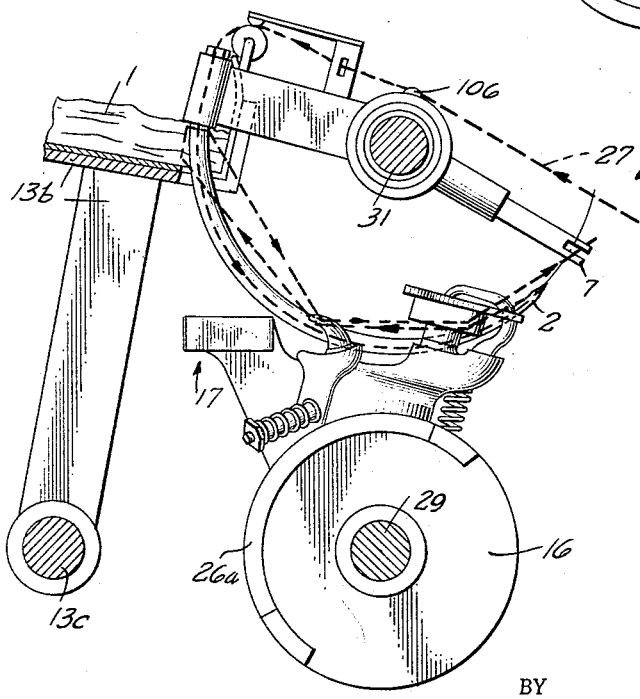
INVENTOR
Hermann Wiegand

Jan. 19, 1965 H. WIEGAND 3,166,035
MACHINE FOR APPLYING SUSPENSION LOOPS FOR
ARTICLES TO BE SUSPENDED
Filed Dec. 4, 1961 7 Sheets-Sheet 7

INVENTOR
Hermann Wiegand

BY

United States Patent Office 3,166,035
Patented Jan. 19, 1965

3,166,035
MACHINE FOR APPLYING SUSPENSION LOOPS
FOR ARTICLES TO BE SUSPENDED
Hermann Wiegand, Am Anger 27, Rasdorf,
Kreis Hunfeld, Germany
Filed Dec. 4, 1961, Ser. No. 157,323
Claims priority, application Germany, Dec. 6, 1960,
W 28,741
9 Claims. (Cl. 112—2)

Suspension loops to be applied to articles of various types for suspending the same, as for instance pieces of meat, tickets and various other articles, had heretofore to be manually inserted into such articles. The goods to be suspended on such loop originate in numerous branches of industry and business. Especially meat and fish to be smoked and dried and numerous grocery store goods are suspended and bundled by means of a loop. Also other goods intended for daily consumption and for industrial purposes are provided with loops.

It is an object of the present invention to provide a machine which will mechanically insert or thread single or multiple loops of any type and size into the various articles to be suspended.

It is another object of this invention to provide a machine of the type set forth in the preceding paragraph, which is relatively simple in construction and easy to operate.

These and other objects and advantages of the invention will appear more clearly from the following specification in connection with the accompanying drawings, in which:

FIGURES 5 and 6 are perspective views showing the knotting device of the machine from opposite sides thereof.

FIGURE 7 illustrates diagrammatically the machine with the table in working position and with one end of the looping material in the knotting device and before the needle pierces the article on the table.

FIGURE 8 shows the machine after the needle has pierced the article on the table and has placed the other end of the looping material in the knotting device.

FIGURE 11 is a detailed view showing the construction of the thread gripper.

Figure 1:
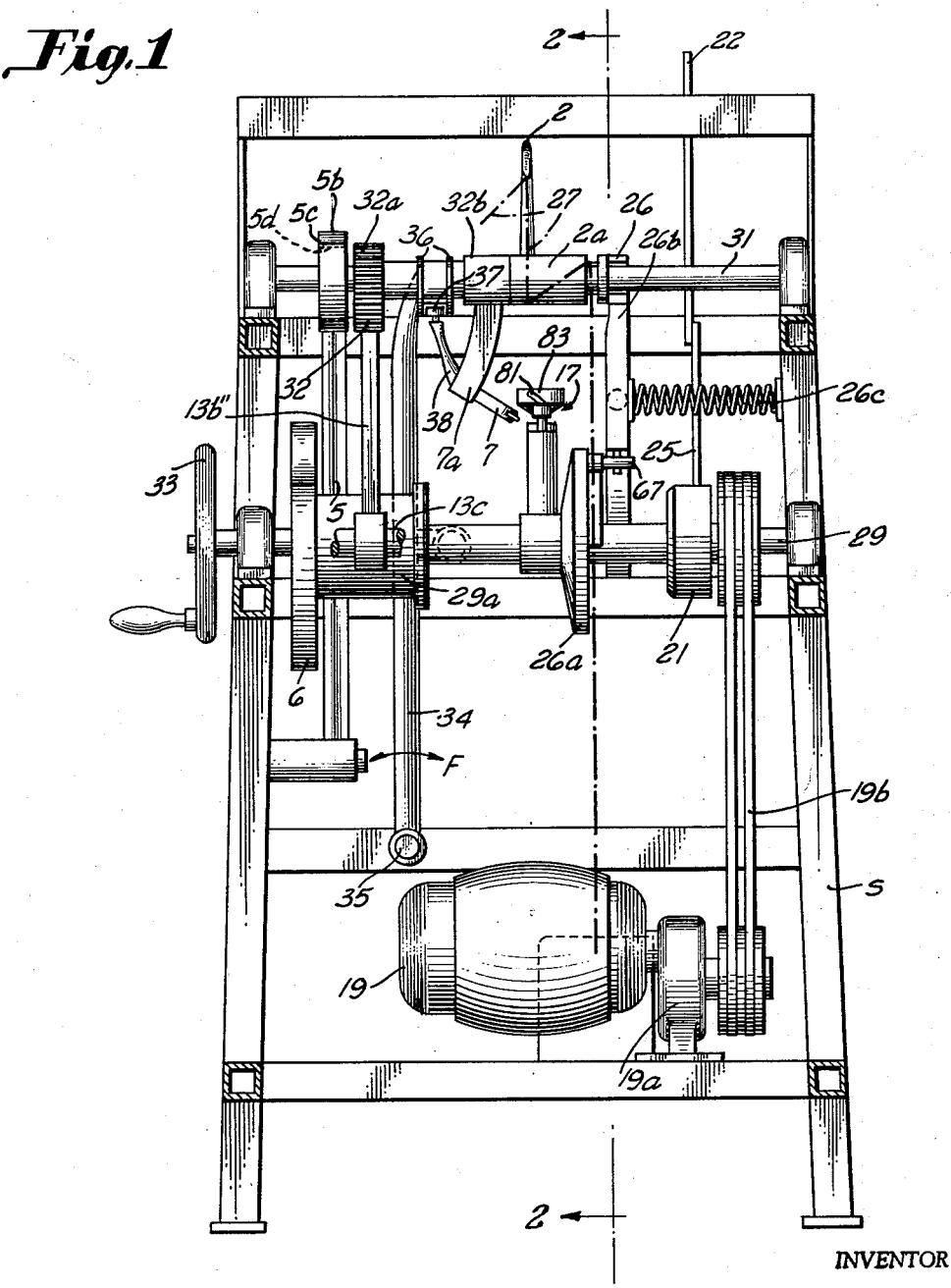
FIGURE 1 is a front elevational view of a machine according to the present invention.

The machine according to the present invention for inserting or threading loops into articles, especially meat, fish, tickets, and the like, by means of a thread guiding needle is characterized primarily in that the work table on which the article to be looped will rest is movable relative to the thread guiding needle and has associated therewith a movable thread catcher which in its turn is operatively connected to a knotting device for feeding thereto the respective thread or wire.

Advantageously, the needle which pierces the article to be looped and guides the thread or wire through the portion of the goods to be pierced, and the knotting device for knotting the thread or wire to a loop are movable relative to each other in such a way that following the piercing of the respective article and the withdrawal of the work piece, the needle places the thread or thin wire into the knotting device.

According to a highly advantageous embodiment of the invention, the needle is designed as arched hollow needle arranged on a web rotatable with the control shaft of the machine. The work table, the thread catcher lever, the needle lever and the knotting device are according to this preferred embodiment of the machine driven separately by means mounted on a common drive shaft.

Referring to the drawings in detail, the machine comprises a frame S carrying a drive motor 19 driving through transmission 19a and belts 19b to a control shaft 29 which operates the machine.

Drive shaft 29 has a single revolution clutch 21 thereon which, when actuated, will permit a single rotation of shaft 29 whereupon the shaft will halt while belts 19b can continue to run.

Tiltably mounted in the frame is a table 13 for receiving a workpiece 1 in which a loop is to be placed. Table 13 is supported by arms 13b and 13b' on a shaft 13c. The table is tiltable from a loading position spaced from the piercing needle of the machine into a working position where the table is adjacent the needle and wherein a workpiece or article 1 on the table against abutment wall 13a will be pierced by the needle. The table, shown in loading position in FIGURE 2, is operated by cam follower means carried by an arm 13b" attached to the table and following a suitable shaped cam groove in cam 6 mounted on single revolution control shaft 29.

Figure 2:
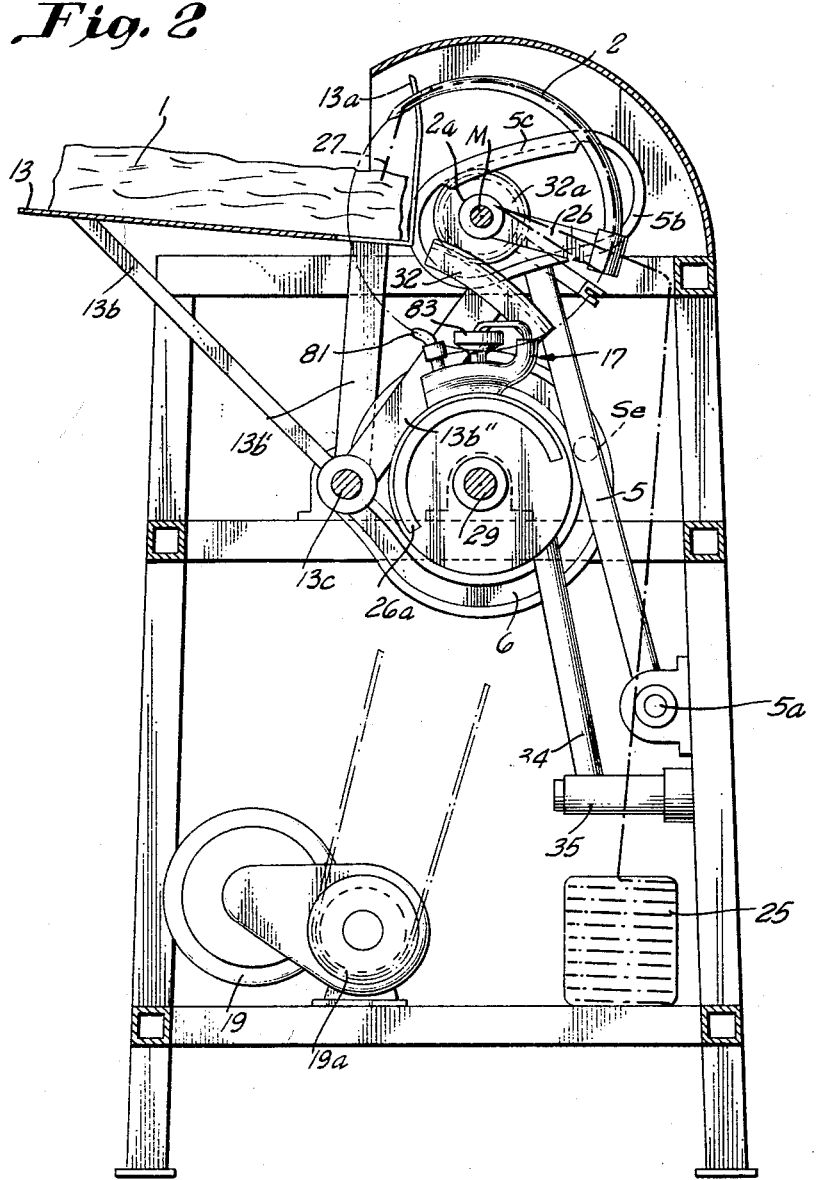
FIGURE 2 is a cross sectional view indicated by line 2—2 on FIGURE 1.

FIGURES 1 and 2 will also show that the machine includes a piercing needle 2 formed as a circular segment and either hollow or grooved so that the looping material such as wire or cord 27 can be passed therethrough. The end of the needle 2 opposite the point end is carried by an arm 2b on a hub or sleeve 2a keyed to a shaft 31 rotatably carried in an upper part of the machine frame.

Shaft 31 also has mounted thereon a pinion 5d meshing with a gear sector 5c on the upper end of an arm 5 pivoted at 5a in the machine frame. Arm 5 carries, at 5e, a roller engaging a suitably shaped cam groove in cam 6 so that arm 5 can be oscillated about its pivotal connection thereby to oscillate shaft 31 to cause needle 2 to move to pierce an article on table 13.

As will be seen in FIGURE 2, arm 13b" fixed to the table structure has a gear sector 32 at its upper end that meshes with a pinion 32a rotatable on shaft 31. Pinion 32a is connected by a sleeve with a hub element 32b to which is fixed a support arm 7a that moveably carries two arms 8 and 9 making up a thread gripper. Movement of arm 8 to open and close the gripper jaws is accomplished by a roller 37 connected to portion 38 of arm 8 that engages a shiftable ring 36 which is mounted on the upper end of an arm 34 pivoted in the machine frame at 35. Bracket 39 on arm 34 carries roller 40 engaging cam 28 on control shaft 29.

The ends of arms 8 and 9 are arcuately formed so that they can engage the needle 2 therebetween but are offset so that when the arms slide off the end of the needle, the looping material extending through or along the needle will be gripped by the arms and drawn from the needle.

The gripping device, as will be seen in FIGURE 11, comprises the two arms 8 and 9 pivotally mounted in support member 7a with teeth 30 being provided to cause the arms to open and close in unison.

The aforementioned gear sector 32 and pinion 32a interconnect the table and the thread gripper so that when the table is in its working, or FIGURE 2 position, the gripper is retracted backwardly in the machine whereas, when the table is tilted outwardly to loading position, the gripper is positioned on the needle just past the end of the needle to grasp the looping material when the arms are drawn off the point end of the needle.

The aforementioned thread gripper in its movement to and from the end of the needle passes a knotting device 17 and places the thread gripped in the gripper in the said knotting device. This knotting device is located so that needle 2 also passes by the knotting device at the end of a piercing operation so that the wire or cord extending through the needle is also placed in the knotting device. The knotting device is then operable for cutting off the ends of the loop of material extending through the article while still gripping the said ends and for then knotting the said ends together.

This knotting device is stationarily mounted in the machine by being supported on shaft 29 while being fixedly held in place by a strut member 18 stationary in the frame.

The knotting device, best seen in FIGURES 5 and 6, comprises a cast body 80 having a knotting hook 81 connected to a bevel gear 82 and having a cutter head 83 provided with a driving bevel gear 84. The cutter head also includes pressing plate 85 with hook 86, a pressing spring 87, cam plate 88 with adjusting spring 89, and thread clamp 90.

The cutting off of the ends of the loop is accomplished by rotating cutter head 83, which is provided with cutter edges 93.

The driving of the knotting device is accomplished by the bevel gear 16, which has toothed portions engageable with bevel gears 82 and 84. During one rotation of drive shaft 29 the bevel gears 82 and 84 are first held stationary by the untoothed portions 91 of gear 16. Thereafter, the teeth of gear 16 will engage gears 82 and 84 so that first bevel gear 82 is driven for actuating the knotting hook 81. This knotting hook makes an entire revolution for each revolution of shaft 29. Shortly after knotting hook 81 rotates bevel gear 84 will be actuated and cutter head 83 will carry out a half revolution and cut off the ends of the knotted loop.

Figure 3:
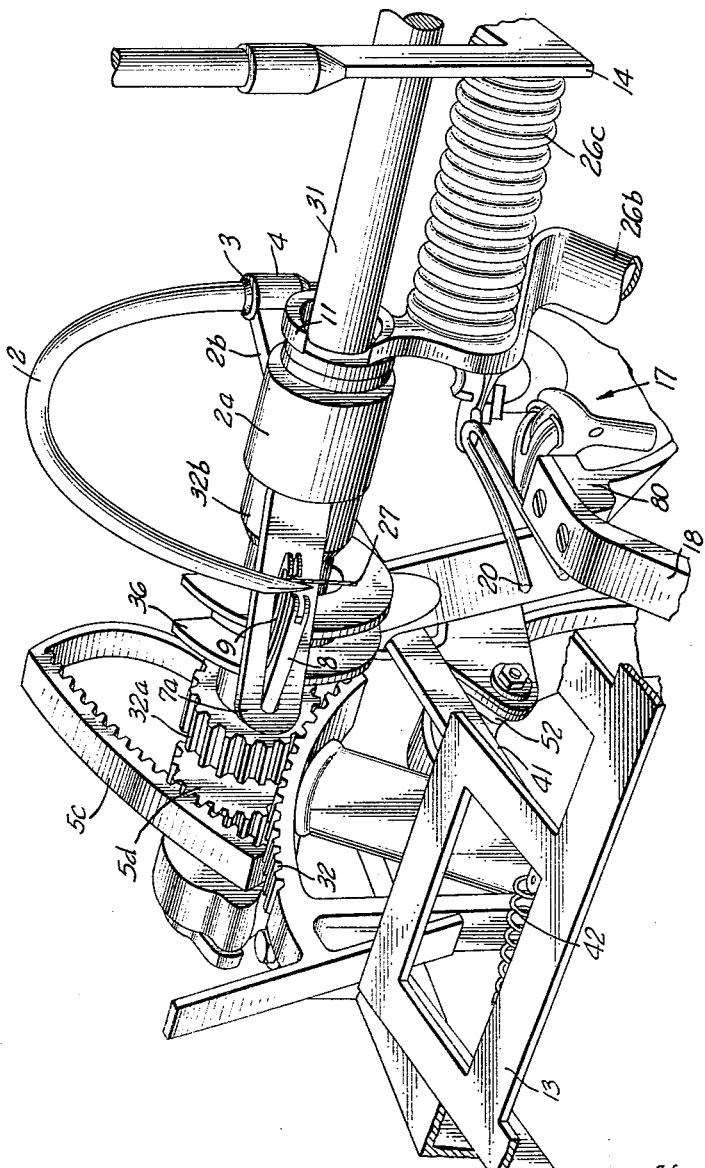
FIGURE 3 is a perspective view of the upper portion of the machine.
Figure 4:
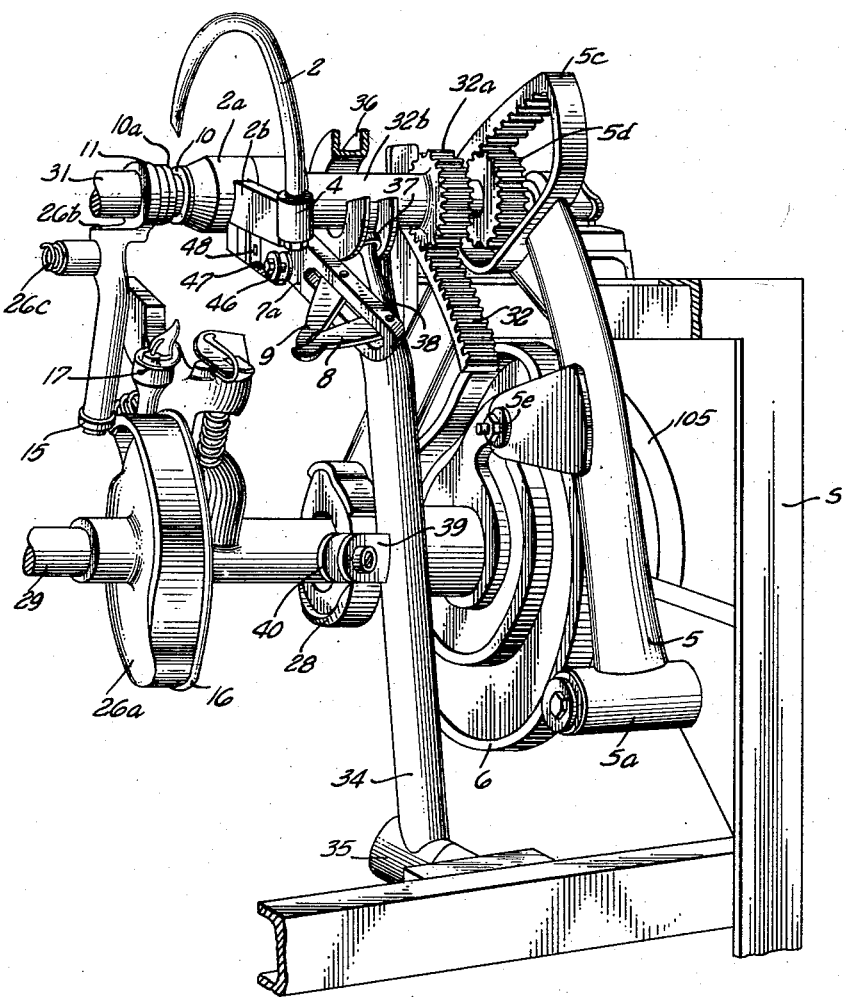
FIGURE 4 is a perspective view similar to FIGURE 3, but looking in from the opposite side and showing other parts of the machine.

Thread clamping means is provided which will hold thread 27 fast during the cutting off operation. The unit comprises the thread clamping ring 10 at the end of hub 2a, arms 26b, the slide ring 10a on the upper end 11 of arms 26b, and thread clamping cam 26a which is formed on the back of gear 16. The thread clamping ring may be a metal ring of circular cross section at a thrust bearing. Furthermore, thread clamping ring 10 and slide ring 11 may be replaced by an encased axial thrust bearing. Slide ring 10a is pressed by means of end 11 of arm 26b when the latter is released to the influence of spring 26c by cam 26a which bears on roller 15 at the lower end of the arm. The pressure at which said slide ring 10a is pressed toward ring 10 is produced by the pressure spring 26c resting against the angle lever 14 of the release linkage (FIG. 3). Said pressure spring 26c is, in order to prevent the same from being soiled, covered by a rubber fold bellows. End 11 at the upper end of arm 26b is forked to embrace shaft 31. Arm 26b is journalled in the machine frame S. Cam 26a, which pushes arm 26b to release position, is a portion of the back side of wheel 16 which drives the knotting device 17. Slide ring 10a and ring 10 are rotatable and will assure that during rotation of sleeve 2a, the thread 27 will not be distorted.

From the foregoing, it will be apparent that the entire operation of the machine is under the control of control shaft 29 which can be caused to make a single revolution by actuation of trip lever 22 which will engage clutch 21 to bring about a single revolution of shaft 29. This single revolution of shaft 29 will actuate the table from unloading position to working position while simultaneously the thread gripper will draw the free end of the thread extending through or along the needle backwardly and place this end in the knotting device. Thereafter, the needle is actuated to pierce the article on the table and which table is now in working position and the needle will also place the thread passing therethrough into the knotting device. The thread is then clamped by the clamping device and cut off and knotted on the parts will return to their original position ready for another looping operation.

To provide a somewhat more comprehensive summary of the present invention, the following is submitted:

The table 13 is tilted on shaft 13c between the outer tilted position which is a loading position and an inwardly tilted position (FIG. 2) which is a working position. This tilting is accomplished by a cam track on cam means 6 which is noted by control shaft 29.

The arm 13b'' fixed to the table has a curved rack 32 thereon meshing with pinion 32a and which pinion is attached to sleeve or shaft means 32b on which is mounted carrier 7a for gripper arms 8 and 9 of gripper means 7. When the table is in its loading position, carrier 7a occupies its FIGURE 9 position with the gripper arms 8 and 9 open and disposed on opposite sides of the tip of needle 2. When the table tilts inwardly toward working position carrier 7a will be swung around to its FIGURE 10 position.

At the beginning of the swinging stroke lever 34 is actuated by its cam 28 to close arms 8 and 9 through the intervention of collar 36 that engages arm 8 whereby the arms close and grip the looping material and draw it from the needle. As the grippers move the gripping material is introduced into the knotting mechanism.

After the table has been completely tilted to its working position (FIG. 7), the needle 2 is operated by movement of lever 5 which is driven by another cam track on cam means 6. Arm 5 has a gear sector 5c meshing with pinion 5d that is connected by a shaft means with needle 2. The movement of arm 5 causes needle 2 to pierce the article on table 13 and to move to the position illustrated in FIGURE 8.

Figure 10:
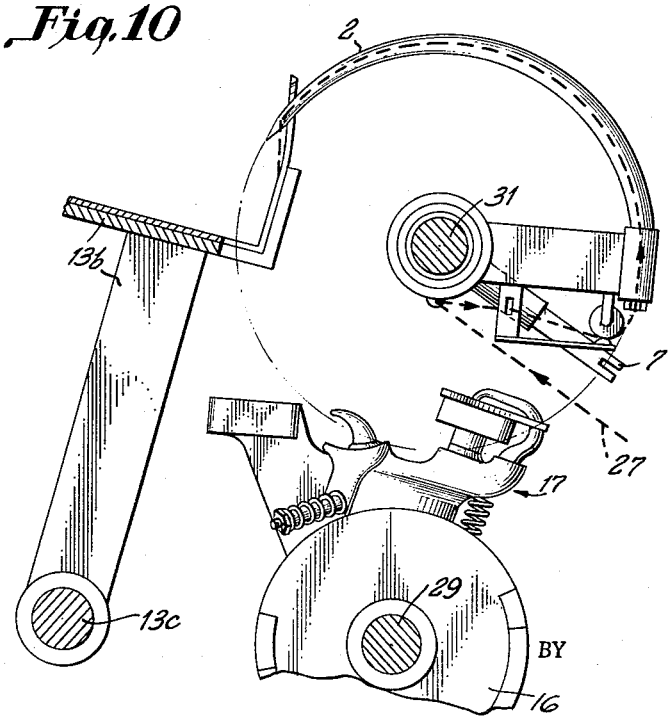
FIGURE 10 shows the machine in idle position before the starting of a work operation.

This movement of needle 2 will carry the looping material extending through or along the needle to the knotting device so that at this time both ends of the loop to be formed are placed in the knotting device. The looping material is now knotted and cut off, and the needle 2 returns to its starting position as illustrated in FIGURE 10 except that at this time the looping material terminates just beyond the end of the needle.

Figure 9:
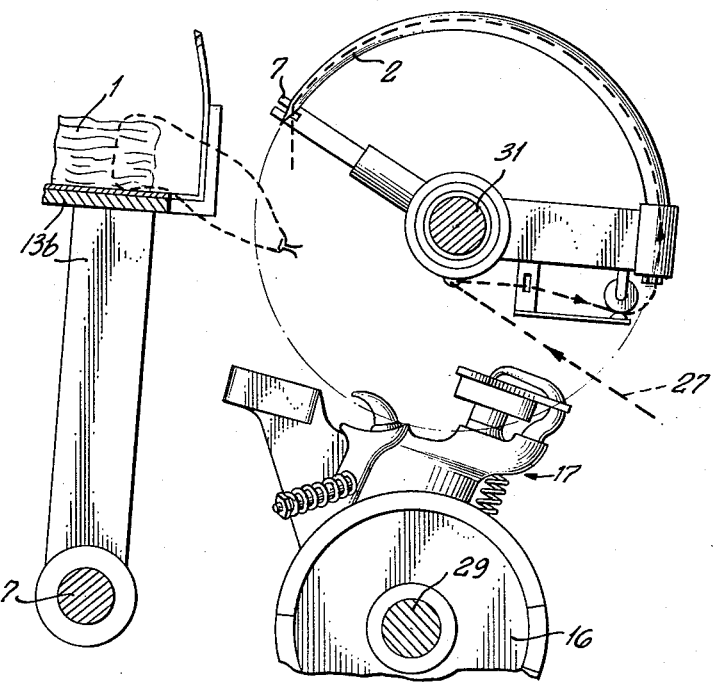
FIGURE 9 shows the machine after the loop has been knotted and cut off and the needle has retracted and the table has tilted back to loading position.

The table 13 is now tilted outwardly by its cam and this will carry the gripping mechanism 7 consisting of arms 8 and 9 and carrier 7a into the position diagrammatically illustrated in FIGURE 9. One complete cycle has now been completed and the article on the table has had a loop of looping material strung through and tied into a loop and the machine is ready for operating another article.

The single cycle operation referred to is obtained by the single revolution clutch 21 which, when actuated by trip lever 22, produces a single revolution of the control shaft 29 which produces one revolution of the cams carried thereby and the aforementioned single complete cycle of operation. The same operative cycle may be had, of course, if the table is stationary and the other parts of the mechanism tilt in the supporting frame.

It will be understood that this invention is susceptible to modification in order to adapt it to different usages and conditions; and accordingly, it is desired to comprehend such modifications within this invention as may fall within the scope of the appended claims.

What I claim is:

1. In a machine for inserting loops of looping material into articles, such as meat articles: frame means, table means supported by said frame means for receiving the article to be looped, needle means supported by said frame means on one side of the table and having the point end thereof free and being moveable in the direction of the point end thereof from a retracted position to an advanced position and being adapted when so moved for piercing an article on the table and for guiding looping material through the article, means for moving said table means and needle means relatively from a position wherein the table is spaced from said needle means for loading the table to a working position where the table is in the path of said needle means to position an article on the table in position to be pierced by the needle means, knotting means in the frame on the other side of the table for knotting the ends of the loop of material in the article, gripper means in said frame means moveable relative to said needle means and knotting means and operable for grasping the looping material at the end of said needle means when the needle means is in retracted position and being movable prior to movement of said needle means from the retracted position thereof for drawing a length of the looping material from the point end of the needle means and for placing the end of the looping material in said knotting means, means for moving said needle means when the table is in advanced position relative thereto to thereby cause said needle means to pierce an article on said table means and insert looping material therethrough, said needle means being moveable past said knotting means when piercing an article on said table and being operable to place the looping material in the knotting means thereby to form a loop extending through the article on the table and having ends in the knotting means, and means for actuating said knotting means to cut off said looping material and knot the ends of the loop together.

2. A machine according to claim 1, in which said table means and gripper means are operatively interconnected for movement in unison relative to said needle means, said interconnection causing movement of said gripper means toward said needle means when the table means and needle means are moved relatively toward loading position and also causing movement of the gripper means toward said knotting means when the table means and needle means are moved relatively toward working position.

3. An arrangement according to claim 1, in which said needle means consists of a curved hollow needle adapted to pass looping material therethrough in longitudinal direction of said needle, and rotatable shaft means in said frame having said needle means mounted thereon, the axis of said shaft passing through the center about which said needle is curved.

4. A machine according to claim 2, which includes: a control shaft in said frame, actuating means on said control shaft operatively connected to said table means and said needle means and said knotting means for actuating the same sequentially, and means for rotating said control shaft.

5. A machine according to claim 4 which includes; clamping means for clamping said looping material during the operation of said knotting device, said clamping means being positioned in the path of said looping material ahead of said needle means, and actuating means on said control shaft operatively connected to said clamping means to actuate the same in timed relation to the actuation of said knotting device.

6. In a machine for inserting loops of looping material into articles, such as meat articles; frame means, table means tiltably supported by said frame means for receiving the article to be looped, and moveable from a tilted out loading position to a tilted in working position, arcuate needle means rotatably supported by said frame means for guiding looping material and having the point end free, said needle means having a retracted position above the table means when the table means is in working position, means for moving said needle means toward the point end thereof when the table means is in working position to thereby cause said needle means to pierce an article on said table means and pass to below the table and insert looping material carried by the needle means through the article on the table, control shaft means in the frame, a drive motor operatively connected to said control shaft means, cam means on said control shaft means and operatively connected to said table means and to said needle means for effecting movement of the table means between the said loading and working position thereof and to actuate said needle means in timed relation thereto, gripper means mounted in said frame meas for movement to and from the point end of the needle means and connected with said table means for movement thereby so that the gripper means will move toward the needle means when the table means moves toward tilted out position and away from the needle means when the table means moves toward tilted in position, said gripper means being operable for grasping the looping material at the point end of said needle means prior to the piercing of an article by said needle means and for drawing it therefrom, knotting means in said frame means below the table means operable for knotting the ends of said looping material together, said gripper means in drawing looping material from the needle means moving past said knotting means and being operable for placing the grasped end of the material in said knotting means, said needle means upon piercing an article on said table means also moving past said knotting means and placing the other end of said looping material in said knotting means, and other cam means on said control shaft means to actuate said knotting means to knot the said ends together.

7. A machine according to claim 6 in which includes a shaft in the frame supporting said needle means, a pinion on the said shaft, a gear sector meshing with said pinion, a lever pivoted in the frame carrying said gear sector, and a roller on the lever engaging one of the cam means on said control shaft means for actuating said needle means when the control shaft means rotates.

8. A machine according to claim 7 which includes a sleeve rotatable on said shaft and supporting said gripper means, a second pinion on said sleeve, and a second gear sector connected to the table and meshing with said second pinion to effect the said connection of the table means to the gripper means.

9. In a machine for inserting loops of looping material into articles, such as meat articles; frame means, table means moveably supported by said frame means for receiving the article to be looped, needle means supported by said frame means for piercing the article and for guiding looping material and having a retracted position above the table means, means for moving said table means from a loading position spaced from the needle means to a working position adjacent said needle means, means for moving said needle means downwardly when the table is in working position to thereby cause said needle means to pass through an article on said table means and to advance to a position below said table means while inserting looping material through the article, gripper means operatively connected to said table means and operable for grasping the looping material at the end of said needle means when the table is in loading position, and knotting means in the frame in the path of said gripper means and needle means operable for knotting the ends of the loop, said gripper means being moveable by said table means in response to movement of the table means into working position for drawing looping material from said needle means and for placing the grasped end of the loop in said knotting means, said needle means moving past said knotting means when piercing an article and being operable to place the other end of the loop in said knotting means, said gripper means including relatively moveable gripper arms, means to close the arms to grasp looping material at the needle means and to open the arms to release looping material after it is placed in said knotting means, and means for actuating said knotting means in timed relation to said needle means and gripper means.

References Cited in the file of this patent

UNITED STATES PATENTS

| | | |
|---|---|---|
| 936,898 | Holly | Oct. 12, 1909 |
| 1,030,619 | Smith | June 25, 1912 |
| 1,322,842 | Sutton | Nov. 25, 1919 |
| 1,513,898 | Fleckser | Nov. 4, 1924 |
| 1,763,731 | Wanders | June 17, 1930 |

FOREIGN PATENTS

| | | |
|---|---|---|
| 784,491 | France | Apr. 29, 1935 |